United States Patent [19]

Müιιρπε

[11] 4,396,310

[45] Aug. 2, 1983

[54] CLAMPING ARRANGEMENT TO JOIN A HUB WITH A SHAFT

[76] Inventor: Ralph Müllenberg, Grevenbroich, Fed. Rep. of Germany

[21] Appl. No.: 339,051

[22] Filed: Jan. 12, 1982

[30] Foreign Application Priority Data

Jan. 14, 1981 [DE] Fed. Rep. of Germany ....... 3100865

[51] Int. Cl.³ .......................... B25G 3/00; E21B 9/16; F16D 1/00
[52] U.S. Cl. ..................................... 403/16; 403/370; 403/373
[58] Field of Search ............... 403/367, 368, 369, 370, 403/373, 16

[56] References Cited

U.S. PATENT DOCUMENTS

| | | | |
|---|---|---|---|
| 3,596,943 | 8/1971 | Krauss | 403/373 X |
| 3,847,495 | 11/1974 | Peter | 403/370 |
| 3,849,015 | 11/1974 | Peter | 403/368 X |
| 4,268,185 | 5/1981 | Müllenberg | 403/370 X |

FOREIGN PATENT DOCUMENTS 216544  7/1958  Australia .............................. 403/370

Primary Examiner—Wayne L. Shedd
Attorney, Agent, or Firm—Schwartz, Jeffery, Schwaab, Mack, Blumenthal & Koch

[57] ABSTRACT

The invention relates to a clamping arrangement to connect a hub with an inner structural part, in particular a shaft, including at least one outer taper ring having an inner conical surface tapered at a self-returning angle. The tapered ring cooperating with a tapered outer circumferential surface of a tub. Axially acting lock bolts, tension the tapered ring against the hub locking the assembly to the shaft. Wedge segments, distributed circumferentially and arranged axially between the taper ring and a counter-support on the hub, are provided. The wedges are displaced radially by means of radial release bolts and pressure the tapered ring axially off the conical surface of one hub releasing the same from the shaft.

12 Claims, 3 Drawing Figures

CLAMPING ARRANGEMENT TO JOIN A HUB WITH A SHAFT

BACKGROUND OF THE INVENTION

1. Field of the Invention

The invention relates to an assembly for connecting an external cylindrical part or member having a cylindrical opening to an inner structural part having a cylindrical outer surface, in which the inner structural part is arranged concentrically in the opening of the external part. More particularly, the external structural part is a hub and the internal structural part is a shaft. In the connecting assembly, axially acting locking bolts tension a tapered ring into engagement with a conically surfaced hub. A plurality of wedge segments are arranged between the tapered ring and a counter-support which is circumferentially arranged on the hub. These wedge segments exert axial pressure on the tapered ring to release the conically surfaced hub from engagement with the ring.

2. Description of the Relevant Art

Shaft fastening assemblies of this general type are known in a number of patents. In French Pat. No. 1,361,776 the hub itself carries the external conical circumferential surface. In German Pat. No. 2441400, a ring with an outer conical surface is seated in a cylindrical hub having an inner conical surface, and the inner conical surface of the hub cooperates with the outer conical surface of the ring. Finally, in the disclosure of German Pat. No. 77 18 439 a cylindrical hub is surrounded by a cone ring having two opposingly inclined conical surfaces, which copperate with two outer conical rings.

The general problem in hub and shaft arrangements is to lock the hub and shaft in a manner allowing transmission of an adequate torque through the assembly. For this purpose, the hub must be compressed annularly on the shaft. Generally the compression is applied by means of lock bolts, which act to axially displace the external tapered ring, and thereby produce forces acting radially through the cone of the tapered ring against the inner structural part or shaft. A portion of these forces are, however, consumed in the deformation of the hub and are not available for the generation of clamping forces.

In order to adequately fix the hub to the shaft, the outer tapered rings must be subjected to very high stress. The greatest radial forces are generated when self-retaining cone angles are used. In these assemblies, the outer tapered ring is seated with extraordinary force after locking in engagement with the conical surface of the hub. It is conventional in assemblies of this type to use axial release bolts to unlock the tapered rings. The release bolts apply an axial force in the opposite direction on the tapered ring following the release of the lock bolts, thereby moving it off and conical surface of the hub. The stronger the force seating the tapered ring, the more axial release bolts must be provided. These release bolts are located between the lock bolts and occupy space that is not available for the lock bolts. The requirement of releasability is thus gained at the expense of placing the maximum number of lock bolts over the circumference and generating of a maximum in transferable torque.

Axial displacement of the tapered rings employing conical locking arrangements by means of a further taper arrangement is known per se from German OS No. 25 14 313. As disclosed in that reference, the additional clamping arrangement serves merely to secure the hub on the shaft. In the present invention, axial lock bolts serve this purpose. German reference No. 25 14 313 discloses self-retaining angles on the conical surface which provide the clamping action, but it is not apparent from the disclosure how the existing clamping arrangement may be released.

OBJECTS AND SUMMARY OF THE INVENTION

The invention has as an object a clamping arrangement for joining hub with an inner structural part having a cylindrical outer surface, using a maximum number of lock bolts, while permitting release of even the most tightly seated tapered ring.

As provided by the invention, it is no longer necessary to arrange the release bolts between the lock bolts. Rather, the release bolts act perpendicularly to the lock bolts and thereby do not occupy space otherwise available for the lock bolts.

Furthermore, the force of the release bolts is amplified by providing a plurality of wedges. It is thus possible to apply a much larger release force with fewer release bolts perpendicularly arranged with wedges on the outer tapered ring, than it has been possible with conventional arrangements in which the release bolts act axially and directly on the tapered ring.

In the clamping arrangement of the instant invention, the tapered ring is provided with a conical surface tapered radially toward the center of the ring. This radially tapered conical surface is acted upon by the wedge segments in cooperation with the release bolts. The taper is measured from the radial plane and is relatively small so the conical surface does not deviate greatly from the radial plane. For the tapered conical surface cooperating with the wedge segments, both self-retaining angles, less than 7°, and non-self-retaining angles may be used.

Wedge segments which are relatively narrow as viewed in the circumferential direction, may be designed with flat wedge surfaces. If, however, the wedge segments extend over relatively large circumferential angles, it is desirable to provide wedges in the form of ring segments formed at an angle complementing the conical surface of the tapered ring.

In principle, the wedge segments may apply their wedging effect either inwardly or outwardly when pulled onto the hub or pressured off it. However, the preferred embodiment is the latter because it eliminates the necessity for threading the hub to receive bolts which move the wedge segments inwardly. Furthermore, if the wedge segments are properly dimensioned, they are retained in position by cooperation of the hub, the counter-support connected thereto, and the outer tapered ring which is undercut.

The conical surface responsible for the forcing action exerted by the wedges may be located either on the hub or the outer tapered ring itself. However, on occasion both of these alternatives may be undesirable for reasons of manufacturing technology or layout. In such a case, the conical surface may be carried by a separate ring having the conical surface thereon.

BRIEF DESCRIPTION OF THE DRAWINGS

The embodiments of the invention disclosed herein may be better understood with reference to the following drawings wherein.

DETAILED DESCRIPTION OF THE INVENTION

Figure 1:
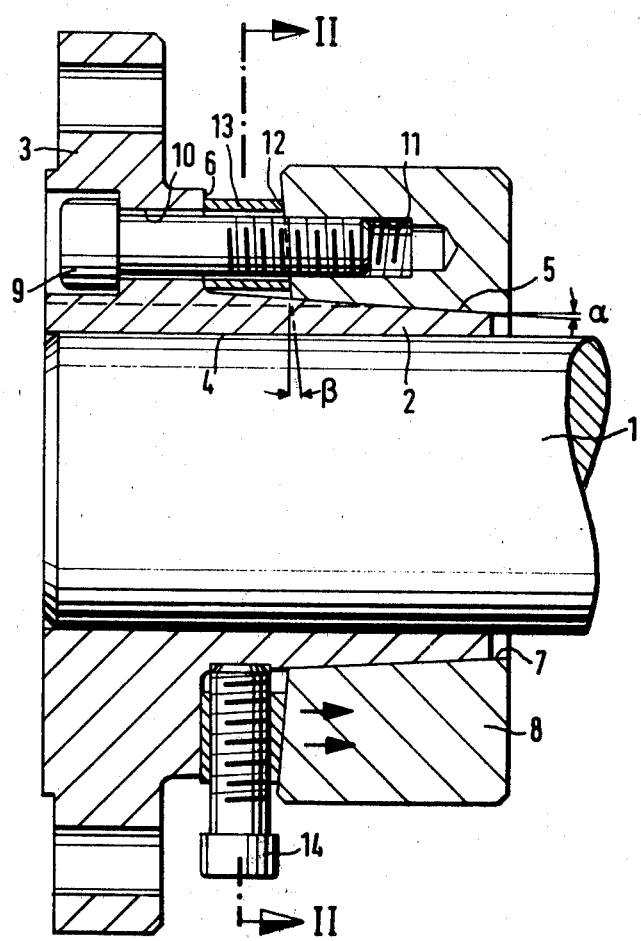
FIG. 1 is a longitudinal cross section through a clamping arrangement to secure a flange with a hub on the shaft.
Figure 2:
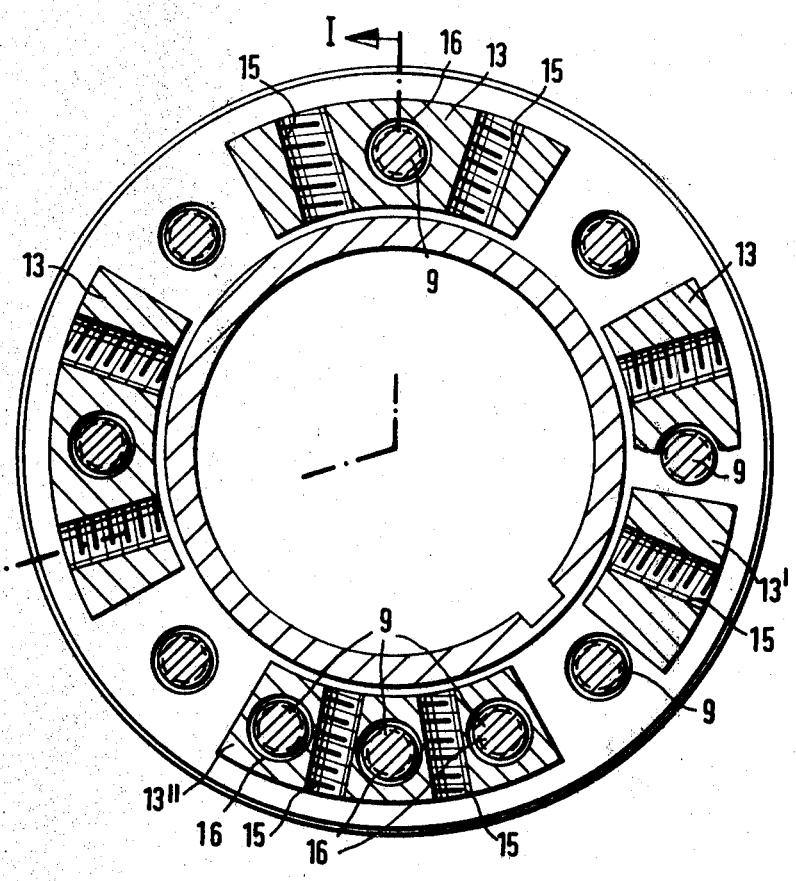
FIG. 2 is a section on the line II—II in FIG. 1.

In the clamping arrangement shown in FIGS. 1 and 2, the inner structural part consists of a shaft 1, upon which a hub or member 2 of a radial coupling or connecting flange 3 is to be secured. The hub 2 rests with its cylindrical inner circumferential surface 4 on the shaft 1 and has a conical outer surface 5, with a cone angle within the self-retaining range. A radial surface located at the thick-walled end of the hub 2 forms a countersupport 6, the function of which is described below.

An inner tapered surface 7 of an outer tapered ring 8 cooperates with the other conical surface 5 of the hub 2. The outer tapered ring 8 is not slit and absorbs the forces for compressing the hub 2 by means of annular stresses generated therein. The outer tapered ring 8 may be pulled onto the conical surface 5 by the application of a large force which generates radial clamping forces. A dividing of lock bolts 9, in this example of embodiment, extend through a plurality of complementary passage bores 10 in the flange 3 and engage threaded bores 11 of the outer taper ring 8. Alternatively, the passage bores may be provided in the taper ring 8 and the threaded bolts in the flange 3, if the clamping arrangement described in FIG. 1 is to be actuated from the opposite direction.

At the thick-walled end of the hub 2, on the side facing the counter-support 6, the outer tapered ring 8 has a conical frontal surface 12 radially tapered with a cone angle $\beta$. Between the counter-support 6 and the cone surface 12 wedge segments in the form of a plurality of tapered ring segments 13 are provided. These tapered ring segments 13 may be displaced radially by means of a plurality of radial release bolts 14, thereby creating a wedge effect at the cone angle $\beta$. In the embodiment represented in FIG. 1, the frontal surface 12 of the outer tapered ring 8 is inclined by means of undercutting, so that the thick-walled ends of the tapered ring segments 13 face the axis of the shaft 1. By tigtening the release bolts 14, an axial force is applied to the outer tapered ring 8 following the release of the lock bolts 9. This axial force is indicated by arrows in the lower part of FIG. 1 and acts to push the tapered ring 8 away from the conical surface 5.

In the form of the embodiment represented in FIG. 1 and the upper part of FIG. 2, four tapered ring segments 13 are provided in a circumferential distribution. Each of the tapered ring segments 13 is equipped with a pair of radially threaded bores 15 for the release of bolts 14. Between the threaded bores 15 are located an axial passage bore 16 for the passing of a lock bolt 9. The bore 16 may, in a preferred embodiment, have sufficient radial clearance to permit the radial displacement of the circumtapered ring segments 13 upon the actuation of the release bolts 14, without having to first remove the lock bolts 9.

In place of the relatively wide tapered ring segments 13, narrower ring segments 13' having only a single threaded bore 15 for a release bolt 14, may be inserted between two lock bolts 9. When such narrow elements are used, it is sufficient to provide them in the form of wedge segments having flat surfaces.

A greater member of lock bolts 9 may be placed in flange 3 of the hub 2 than is shown in the upper part of FIG. 2. The tapered ring segments 13" shown in the lower part of FIG. 2, are provided with three passage bores 16 for the lock bolts 9. It is not important that the passage bores 16 are cut somewhat into the threaded bores 15 for the release bolts 14.

Figure 3:
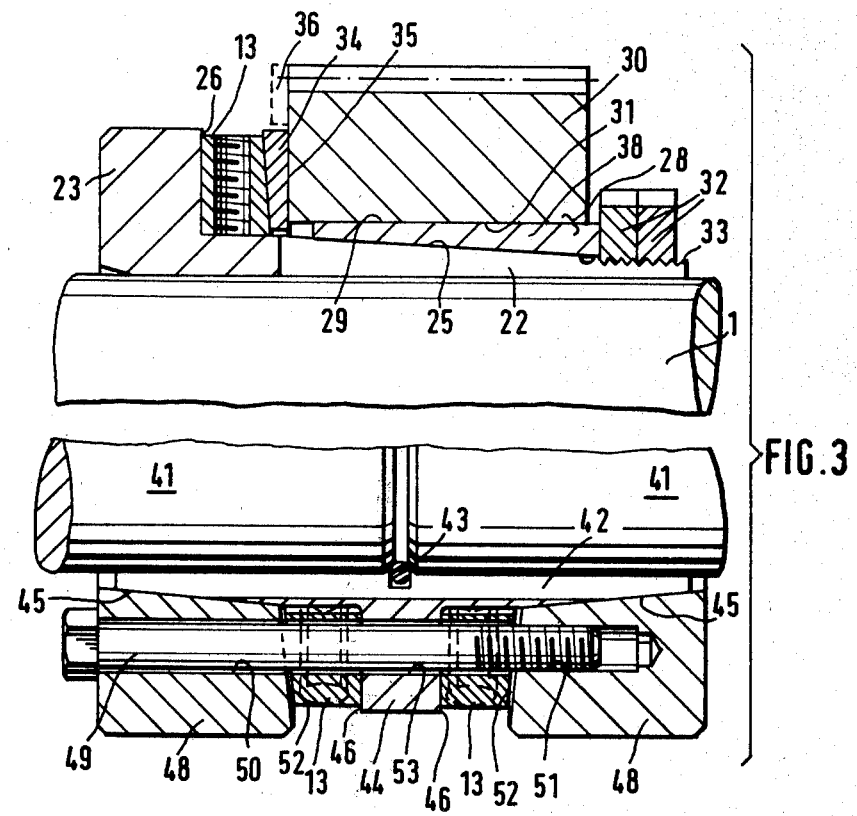
FIG. 3 is a longitudinal cross section corresponding to FIG. 1, displaying further forms of embodiment.

In the embodiment shown in the upper part of FIG. 3, a hub 22 is secured to the shaft 1. A radial flange 23 is joined with the hub 22 and is provided with a counter-support 26 in the form of a radial surface. The hub 22 has an outer conical surface 25 at an angle within the self-retaining range, which cooperates with an inner surface of a relatively thin-walled tapered ring 38. The tapered ring 38, in turn is disposed with its cylindrical outer surface 29 in a passage bore or orifice 31 of a gear 30. Instead of axial lock bolts shown in FIGS. 1 and 2, threaded washers 32, shown in FIG. 3 are preferably screwed onto an external threading 33 on the thin-walled outer end of the hub 22. The washers 32 and external threading 33 cooperatively displace the thin-walled tapered ring 38 in the axial direction, resulting in the radial clamping of the gear 30 on the shaft 1.

The hub is released by loosening the threaded washers 32, and displacing the tapered ring segments 13, which in this embodiment cooperate not with a conical frontal surface on the gear 30, not with a separate tapered ring 34, which rests against a radial frontal surface 35 of the gear 30. Alternatively, the tapered ring segments could copperate with a conically tapered frontal surface on gear 30. The tapered ring 34 may also consist of segments, in which case, however, a radial collar 36, indicated in FIG. 3 by the broken line, must be present, preventing segments from shifting radially outwardly.

The lower half of FIG. 3 shows a further embodiment of the invention. A hub 42 has a pair of outwardly inclined tapered surfaces 45 on its ends. These tapered surfaces may be provided at an angle within the self-retaining range. The hub 42 serves to connect a pair of shaft ends 41. A gasket 43 is arranged between the two shaft ends. First and second outer tapered rings 48 are seated on each conical surface 45 of the hub 42. One of the outer tapered rings is provided with passage bores 50 for lock bolt 49, and the other tapered ring 48 is provided with threaded bores 51, which engage the lock bolts 49 in the manner shown in FIG. 3.

The hub 42 has in its center area a circumferential land 44. The two radial frontal surfaces 46 of the land 44 form counter-supports for the tapered segments 13. Release bolts not shown in FIG. 3 disposed in the threaded bores depicted by the broken lines in the tapered segments 13, urge the tapered segments 13 radially outward, thereby causing a releasing pressure on the tapered rings 48. The tapered segments 13 cooperate with the radially tapered conical frontal surfaces 52 on the tapered rings 48. The circumferential land 44 is provided with passage bores 53 which can be aligned with the bores 50 and 51. The presence of the circumferential land 44 is important, because it makes it possible to release both of the tapered rings 48 at one time. Without the circumferential land 44, tapered ring segments 13 would act solely between the tapered rings 48, and only one of the tapered rings could be released while the other, lacking a counter-support, could not be released at all.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention for the limits of the appended claims.

What is claimed is:

1. An assembly for connecting at least one inner structural part having an outer cylindrical surface to a hub surrounding the inner structural part comprising:
   (a) at least one outer tapered ring, said outer tapered ring having an inner conical surface, said inner conical surface being tapered at a self-retaining angle;
   (b) a hub having an outer circumferential surface, a portion of said outer circumferential surface being conical, said inner conical surface cooperating with said outer circumferential surface;
   (c) means for tensioning said outer tapered ring against said hub;
   (d) a circumferential counter-support adjacent to said outer tapered ring;
   (e) a plurality of wedge segments axially arranged between said counter-support and said outer tapered ring, said wedge segments having at least one threaded radial bore therein;
   (f) and bolts threaded in said threaded bores, whereby said bolts radially displace said wedge segments and pressure said outer tapered ring axially from said circumferential conical surface.

2. The assembly defined in claim 1 wherein said outer tapered ring has a radial conical surface thereon, and said wedge segments are arranged between said radial conical surface and said counter-support.

3. The assembly defined in claim 1 wherein said counter-support has a radial conical surface thereon, and said wedge segments are arranged between said radial conical surface and said outer tapered ring.

4. The clamping assembly defined in claim 1 wherein said wedge segments also include at least a portion of an axial passage bore therethrough.

5. The clamping assembly defined in claim 1 wherein said wedge segments include at least one axial passage bore therein.

6. The clamping assembly defined in claim 5 wherein said wedge segments are a ring segment, said ring segments having two radial threaded bores therein and one axial passage bore intermediate said radial bores.

7. The clamping assembly defined in claim 6 wherein said ring segment further includes a third radial threaded bore therein and a second axial passage bore intermediate said third radial bore and said two radial bores.

8. The clamping assembly defined in claims 2 or 3 wherein said radial conical surface tapers radially toward said inner structural member.

9. The clamping assembly defined in claim 1 wherein said outer tapered ring includes an outer structural part having an inner orifice, and a ring, said ring positioned inside said inner orifice, said ring carrying said inner conical surface.

10. The clamping assembly defined in claim 9 wherein:
    (a) said hub has a flange portion forming said counter-support at one end thereof, an extended portion having threads thereon at the other end thereof and intermediate said ends, a tapered portion having said outer circumferential surface thereon;
    (b) said outer structural part has a radial frontal face thereon facing said flange portion of said hub;
    (c) adjacent said outer structural part facing said counter-support is a separate tapered ring having sides, one side of said ring having a radially tapered surface thereon, said radially tapered surface facing said counter-support;
    (d) said wedge segments are positioned between said counter-support and said separate tapered ring;
    (e) and said means for tensioning said outer tapered ring against said hub is a threaded washer threaded onto said extended portion, said threaded washer axially displacing said ring into locking contact with said outer structural part or said hub and said inner structural member.

11. The clamping assembly defined in claim 6 wherein:
    (a) said counter-support is a portion of said hub;
    (b) said means for tensioning said outer tapered ring against said hub comprises:
       (i) a plurality of axial threaded bores in said outer tapered ring;
       (ii) a plurality of axial bores in said hub;
       (iii) and threaded bolts passing axially through said bores in said hub threaded into said outer tapered ring.

12. The assembly in claim 1 wherein:
    (a) said inner structural part comprises a pair of shaft ends;
    (b) a socket separates said shaft ends;
    (c) said hub has a pair of outer circumferential conical surfaces on its ends, said surfaces being at an angle which is self-retaining;
    (d) a pair of outer tapered rings are seated on said pair of outer circumferential surfaces;
    (e) a circumferential land surrounds said hub intermediate the ends thereof, said land being provided with a pair of frontal surfaces thereon, said frontal surfaces facing said outer tapered ring;
    (f) said wedge segments positioned between each of said frontal surfaces and each of said outer tapered rings;
    (g) said means for tensioning said outer tapered ring against said hub comprises:
       (i) a plurality of axial threaded bores in one of said outer tapered rings;
       (ii) a plurality of axial passage bores in said other outer tapered ring and said land in alignment with said axial threaded bores; and
       (iii) threaded bolts passing through said passage bores threaded into said threaded bores.

* * * * *